United States Patent
Cili et al.

(10) Patent No.: US 8,958,777 B2
(45) Date of Patent: Feb. 17, 2015

(54) CALLER SWITCHING DURING AN ACTIVE VOICE CALL

(71) Applicant: Apple Inc., Cupertino, CA (US)

(72) Inventors: Gencer Cili, Santa Clara, CA (US);
Devrim Varoglu, Santa Clara, CA (US);
Kwangho Byun, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 13/719,582

(22) Filed: Dec. 19, 2012

(65) Prior Publication Data

US 2014/0171033 A1     Jun. 19, 2014

(51) Int. Cl.
| | | |
|---|---|---|
| *H04B 1/04* | (2006.01) | |
| *H04W 4/16* | (2009.01) | |
| *H04J 1/16* | (2006.01) | |
| *H04L 12/66* | (2006.01) | |
| *H04M 15/00* | (2006.01) | |

(52) U.S. Cl.
CPC ..................................... *H04W 4/16* (2013.01)
USPC ... 455/414.1; 370/244; 370/356; 379/114.01; 379/115.02

(58) Field of Classification Search
USPC ...................................................... 455/414.1
See application file for complete search history.

(56) References Cited

U.S. PATENT DOCUMENTS

| 5,027,387 | A | * | 6/1991 | Moll ......................... 379/115.02 |
|---|---|---|---|---|
| 6,853,636 | B1 | | 2/2005 | Merchant |
| 7,885,394 | B2 | | 2/2011 | Baudino et al. |
| 2003/0072302 | A1 | * | 4/2003 | Yakura .......................... 370/356 |
| 2005/0036596 | A1 | * | 2/2005 | Merchant .................. 379/114.01 |
| 2005/0213721 | A1 | * | 9/2005 | Hakala et al. ............. 379/114.01 |
| 2007/0105529 | A1 | | 5/2007 | Lundstrom et al. |
| 2008/0101567 | A1 | * | 5/2008 | Baudino et al. .......... 379/114.01 |
| 2011/0069618 | A1 | * | 3/2011 | Wong et al. .................... 370/244 |

FOREIGN PATENT DOCUMENTS

WO     03077516     9/2003

* cited by examiner

*Primary Examiner* — Timothy Pham
(74) *Attorney, Agent, or Firm* — Meyertons Hood Kivlin Kowert & Goetzel, P.C.; Jeffrey C. Hood

(57) ABSTRACT

Automatic caller switching in a cellular voice call. A first voice call may be initiated between a first wireless user equipment (UE) device and a second UE via a cellular network. An indication may be received to switch calling parties for the first voice call. A second voice call may be established between the first UE and the second UE via the cellular network in response to the indication to switch calling parties for the first voice call. The calling and called parties may be reversed (switched) for the second voice call relative to the first voice call. The first voice call may be disconnected.

11 Claims, 10 Drawing Sheets

CALLER SWITCHING DURING AN ACTIVE VOICE CALL

FIELD

The present subject matter relates to wireless devices, and more particularly to a system and method for a wireless device to switch calling parties during an active voice call.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In wireless voice communications, it is common for service providers to track which party in a voice call is the calling party and which party is the called party. Further, many such service providers provide different service terms to subscribers for incoming- and out-going calls; for example, many plans are structured such that users are charged per minute of call time for (at least some) outgoing calls, but are not charged (or are charged at a different rate) for (at least some) incoming calls. Accordingly (e.g., depending on possible differences in service plans and/or credit of the parties involved in a call, among various possible reasons), in some cases the parties in a voice call might desire that the called-party become the calling party and vice versa.

However, there is currently no straightforward way for users to switch calling parties from within an active voice call. While it is possible for an established voice call to be disconnected (i.e., the users may hang up) and for the previously called party to initiate a new call to the previously calling party, this takes a significant amount of time and effort and represents a significant interruption to the call.

Some service providers offer a mechanism for multi-party calls. Using such a feature, it would be possible for the called party in a voice call to manually place the original call on hold, manually place a multi-party call back to the caller, and manually disconnect the original call once the new call was established, effectively resulting in a switch of calling parties. However, this mechanism requires a similar amount of time and effort as hanging up and re-dialing a call, and also results in an undesirable interruption (e.g., while the first call is on hold and the second call is being established) to the call. Accordingly, improvements in the field would be desirable.

SUMMARY

In light of the foregoing and other concerns, it would be desirable to provide a way for wireless devices to provide a mechanism to automatically and seamlessly switch calling parties of a voice call. Accordingly, embodiments are presented herein of a method for a wireless user equipment (UE) device to implement automatic caller switching for a voice call, and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

Such a mechanism for switching calling parties of a voice call could be available for activation by either or both parties of the voice call. The mechanism could be activated by user input (e.g., via a user-interface option displayed during the call and/or during call setup, by voice activation, or by another form of user input), or automatically (e.g., based on some predefined trigger, such as an amount of credit falling below a predetermined threshold).

Once activated by one party, the other party might be prompted as to whether or not to accept the caller switch. The other party might then accept the caller switch (e.g., in which case the mechanism might proceed as subsequently described) or reject the caller switch (e.g., in which case the call might continue with the original calling party remaining the calling party). Alternatively, if desired, the caller switch might require no further user input by either party once initiated by a party.

The caller switch may be achieved seamlessly, e.g., without noticeable interruption to the call. Numerous techniques may be used to actually achieve the caller switch, e.g., depending on the underlying wireless communication framework being used for the voice call.

For example, some wireless communication technologies (e.g., UMTS, CDMA2000) provide multi-party calling features. For such technologies, the caller switch may be achieved if the called party's device initiates a multi-party call back to the calling party's device. The calling party's device may then accept the second call, at which point the parties may have two simultaneous calls with each other, of which each device is established as the calling party for one of the calls. The original call may then be disconnected, at which point only the second call may be active. Since the called party of the original call may be the calling party for the second call, the calling parties may have been effectively switched/reversed in the second call relative to the original call. Note that this may be performed automatically by the parties' devices (e.g., in conjunction with a service provider, such as a cellular network operator, providing the connection services) and in a manner invisible to the users As another example, alternative signaling mechanisms provided specifically for caller switching may be implemented to achieve the caller switch, if desired. For example, for a Voice over IP (VoIP) session using session initiation protocol (SIP) signaling (such as might occur in Voice over LTE (VoLTE) voice calls), a "switch caller request" message could be defined and used to initiate switching of calling parties in an active voice call. A return call from the called party to the calling party could then be established, after (or just before, depending on whether a break-before-make or a make-before-break connection policy is implemented) which the original call could be disconnected.

The system and method for automatic caller switching in a voice call as provided herein may potentially improve user experience and make more efficient use of a wireless device's battery power, among various possible benefits. For example, user experience might be improved since the caller-switch may advantageously require minimal (or no) user effort and no interruption to the call, among various possible user experience benefits. Additionally, the power consumption of the wireless device may advantageously be reduced, for example, since connection breaking/making and the number of user-inputs required to switch calling parties may be minimized.

BRIEF DESCRIPTION OF THE DRAWINGS

A better understanding of the present subject matter can be obtained when the following detailed description is considered in conjunction with the following drawings.

Figure 1:
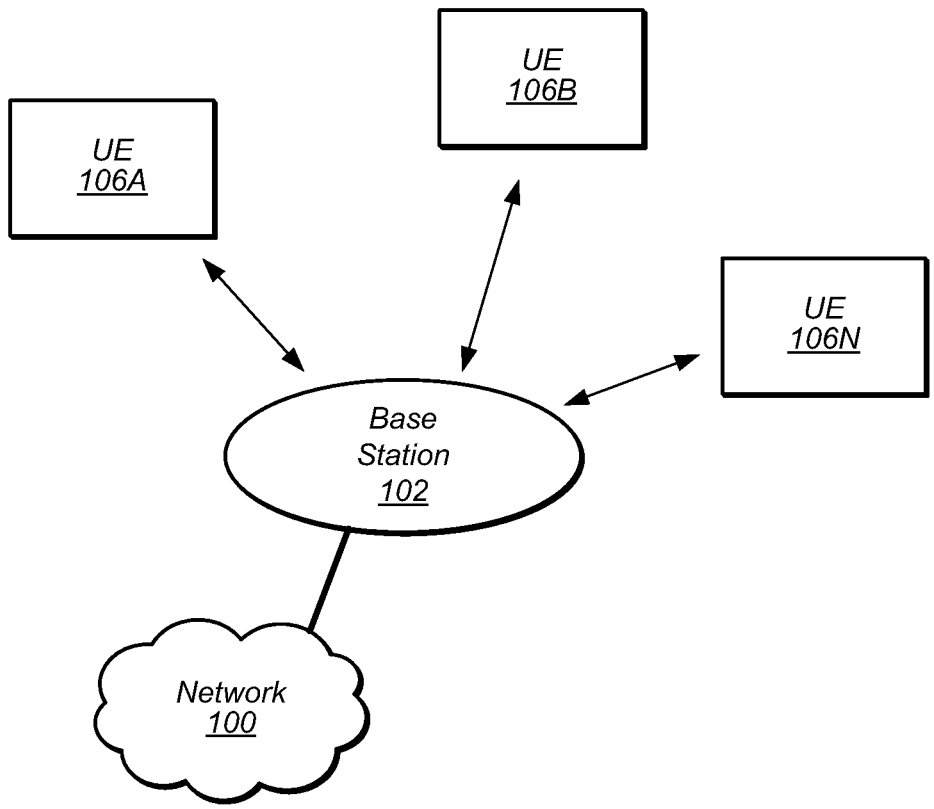
FIG. 1 illustrates an exemplary wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:
UE: User Equipment
BS: Base Station
CS: Circuit-Switched
PS: Packet-Switched
MO: Mobile-Originated
MT: Mobile-Terminated
GSM: Global System for Mobile Communication
GPRS: General Packet Radio Service
UMTS: Universal Mobile Telecommunication System
RNC: Radio Network Controller
RRC: Radio Resource Control
MSC: Mobile Switching Center
CC: Call Control
SGSN: Serving GPRS Support Node
LTE: Long Term Evolution
VoLTE: Voice over LTE
CSCF: Call Session Control Function
SIP: Session Initiation Protocol
SDP: Session Description Protocol
RTP: Real-time Transport Protocol
EPS: Evolved Packet System
DRB: Data Radio Bearer
NAS: Non-Access Stratum

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
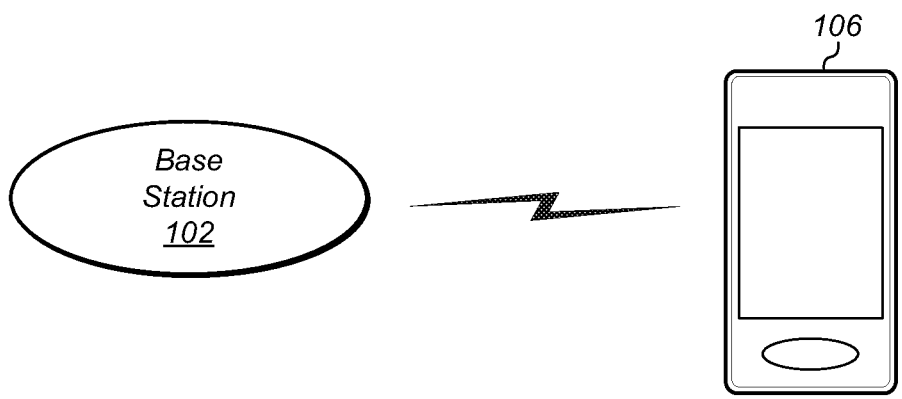
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

UE 106 may be configured to communicate using a wireless communication protocol which provides voice services. The voice services may be provided via circuit-switched communications or packet-switched communications. The UE 106 may also be configured to communicate using a wireless communication protocol (possibly the same protocol) which provides data services. The data services may be provided via packet-switched communications. As one example, the UE 106 may be configured to communicate using LTE or LTE-A with Voice over LTE (VoLTE) support. As another example (e.g., in addition or as an alternative), the UE 106 may be configured to communicate using UMTS (WCDMA) or CDMA2000 (e.g., 1xRTT, 1xEV-DO, HRPD, eHRPD).

Note that the UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. For example, the UE 106 may include one or more antennas to communicate using a wireless communication protocol which provides voice, and possibly also data, services. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and Bluetooth. Other configurations are also possible.

Figure 3:
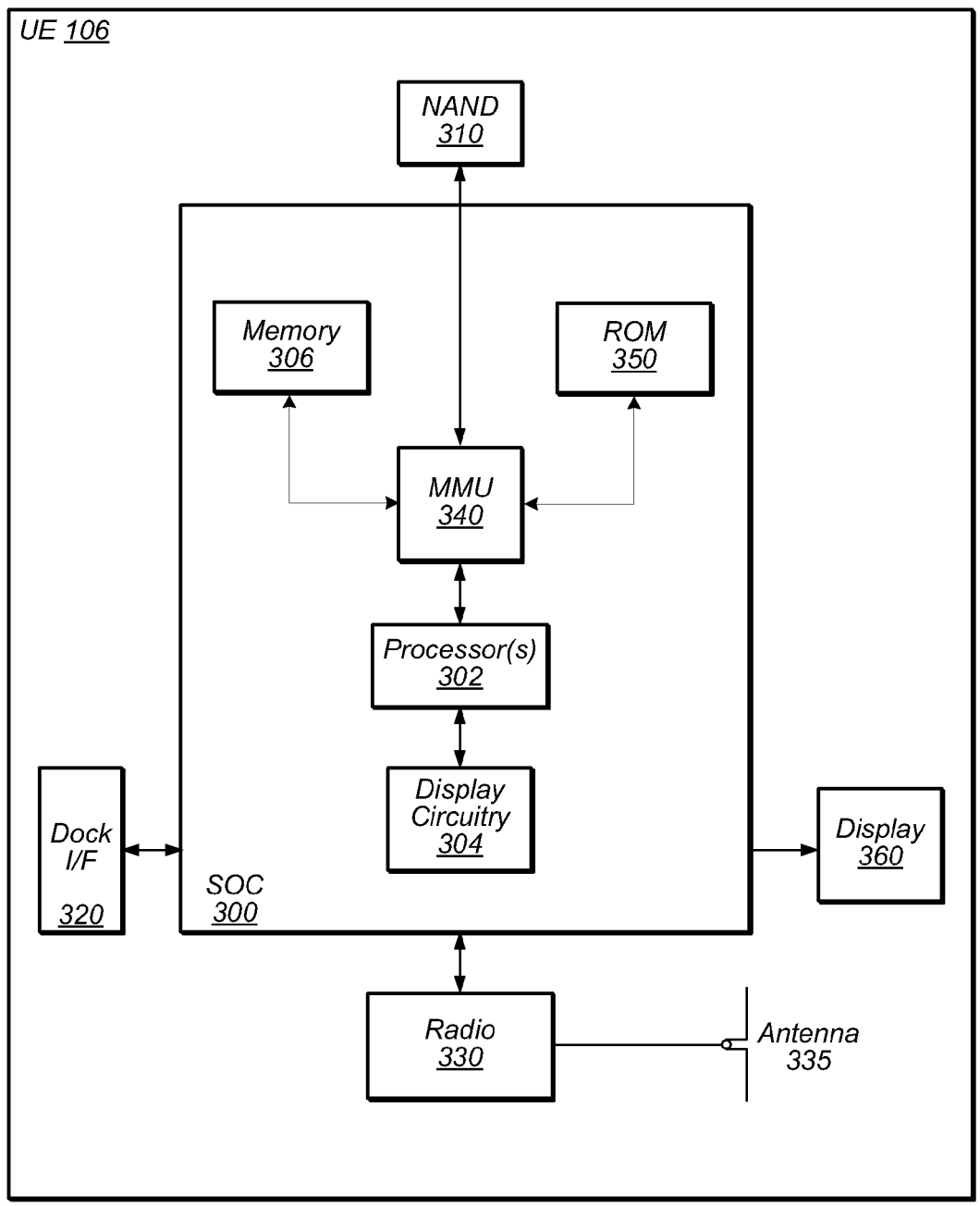
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system or dock), the display 360, and wireless communication circuitry (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, one or more proximity sensing elements, and/or any of various other elements capable of providing information to a user and/or receiving/interpreting user input.

As described further subsequently herein, the UE 106 may include hardware and software components for implementing features for automatically switching calling parties of a voice call, such as those described herein with reference to, inter alia, FIGS. 5-12. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 5-12.

Figure 4:
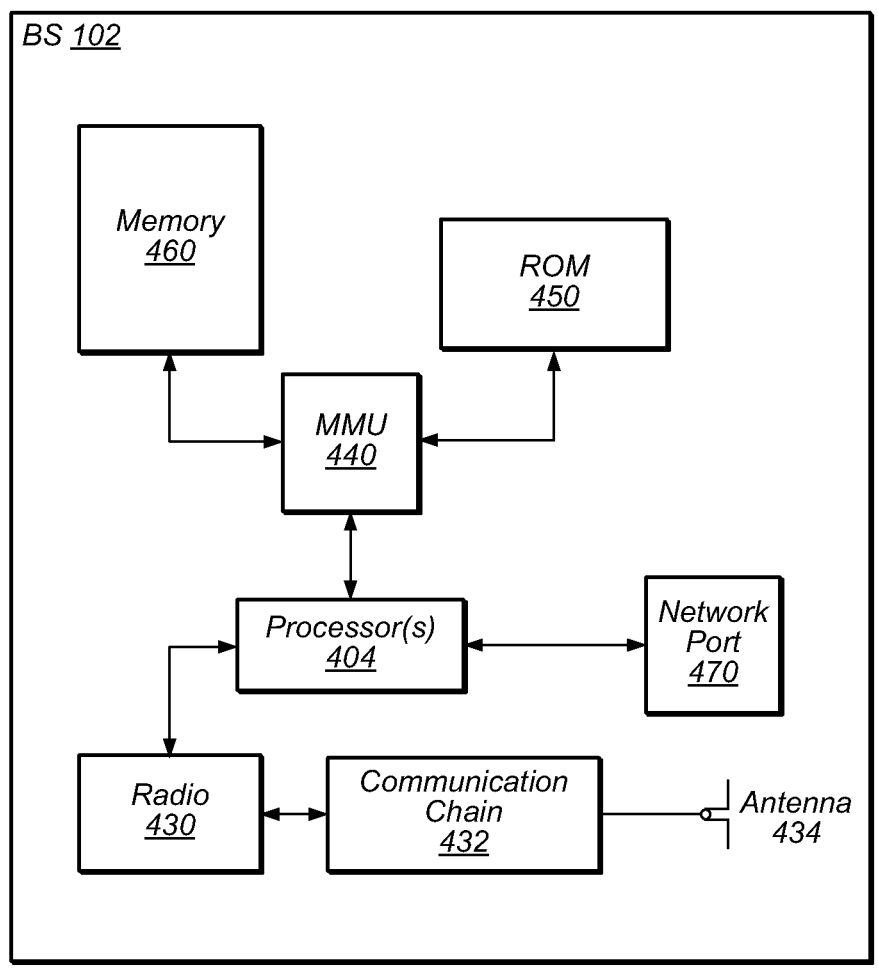
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
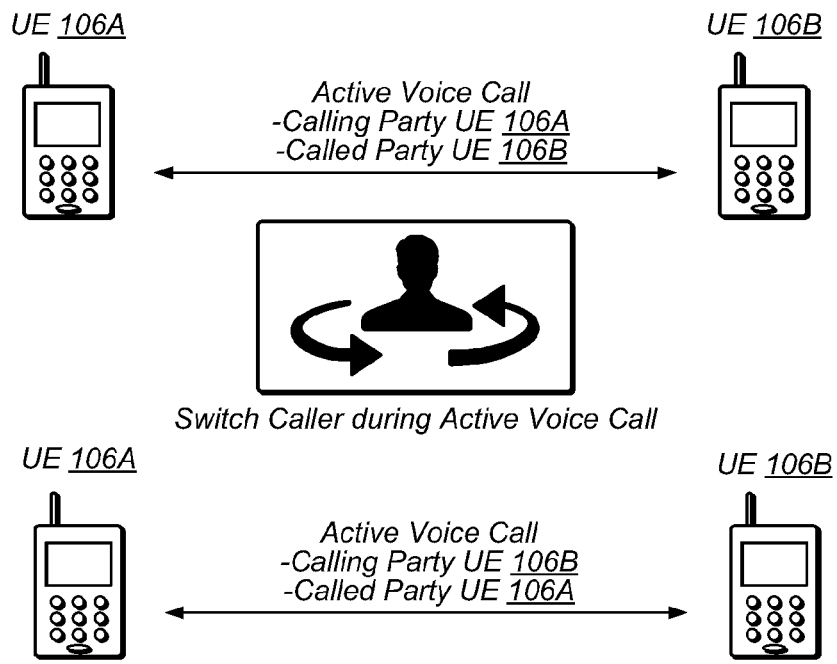
FIG. 5 illustrates an exemplary caller switching feature for use in an active voice call.
Figure 6:
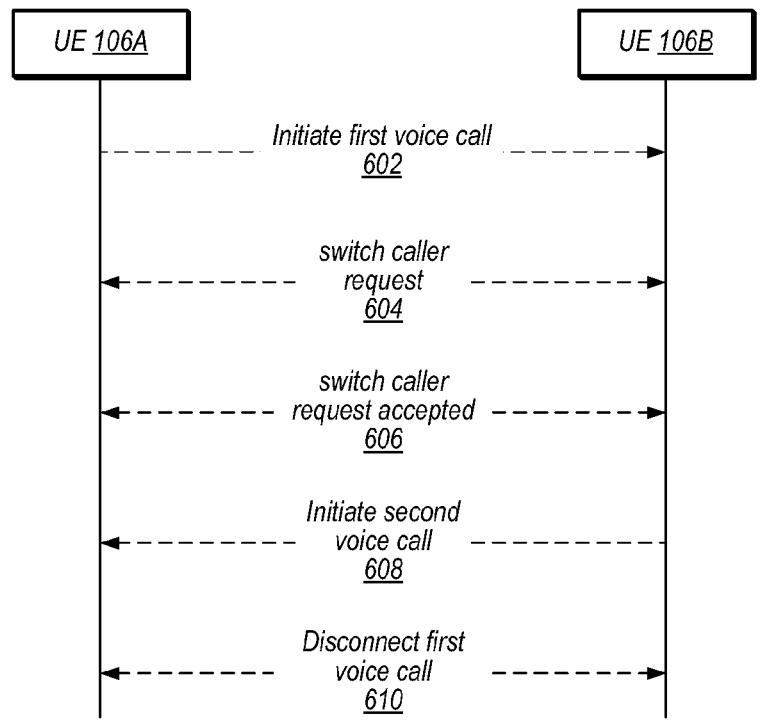
FIG. 6 is a communication diagram illustrating an exemplary method for switching calling parties in an active voice call.

FIGS. 5-6—Caller Switching During an Active Voice Call

Cellular networks may utilize a broad array of possible architectures, potentially including a variety of entities for providing services and features (or elements thereof). One feature which is very common in cellular networks of various configurations is tracking of which is the calling party in a voice call. For example, UMTS network operators may deploy mobile switching centers (MSCs) to (among various other possible functions) record features of voice calls placed on their networks; similarly, LTE network operators which support Voice over LTE (VoLTE) may provide a call session control function (CSCF) to track features of VoLTE calls. Other networks that operate according to other technologies may also track which party in a voice call is the calling party and which party is the called party in similar or different manners.

Depending on how such information is used by a network operator, it might be desirable under certain circumstances for participants in a voice call to switch calling parties. In other words, the calling party may wish to become the called party, or the called party may wish to become the calling party, or both.

Switching calling parties of a voice call might be desirable for any of a number of reasons. One relatively common such reason may relate to the structure of the cellular service plan(s) of the participants. In particular, many cellular service providers provide service plans (potentially including postpaid and/or pre-paid service plans) for which outgoing calls are billed differently than incoming calls, potentially with further refinements based on time-of-day, identities of/relationships between the parties participating in the voice call, and/or tiers of usage (e.g., the first x minutes used in a month may be billed at one rate while subsequent minutes used in that month may be billed at another rate). Accordingly, if switching calling parties would provide a more favorable billing outcome (i.e., reduce the expense of the call) for one or both parties in a call, it might be desirable to switch calling parties in that call.

FIG. 5 illustrates such an exemplary switch of calling parties of an active voice call. As shown, an active voice call might be established between a first UE 106A and a second UE 106B. Initially, the first UE 106A may be the calling party while the second UE 106B may be the called party. After switching callers, however, the second UE 106B may be the calling party while the first UE 106A may be the called party.

FIG. 6 is a communication diagram more particularly illustrating steps of an exemplary method for switching calling parties of an active voice call such as might be used to achieve the caller switch illustrated in FIG. 5. The method shown in FIG. 6 may be used in conjunction with any of the computer systems or devices shown in the above Figures, among other devices. For example, part or all of the method may be implemented by device logic of the UE 106A and/or the UE 106B. In particular, as shown, part of the method may be implemented at the UE 106A while part of the method may be implemented at the UE 106B. Note that although not shown in FIG. 6 in order to avoid obscuring details of the disclosure, UE 106A and UE 106B may communicate indirectly via one or more telecommunication networks (e.g., potentially including one or more cellular service providers, public switched telephone networks, and/or other telecommunication networks). In various embodiments, some of the method elements shown may be performed concurrently, in a different order than shown, or may be omitted. Additional method elements may also be performed as desired. As shown, this method may operate as follows.

In 602, the first UE 106A may initiate a first voice call with the second UE 106B. The second UE 106B may accordingly receive in indication that the first voice call is incoming. The first voice call may be initiated via a cellular network. In other words, the first voice call may be initiated by the first UE 106A via a cellular link according to a cellular technology such as GSM, UMTS, LTE, LTE-A, CDMA2000 (1xRTT, 1xEV-DO, etc.), etc. Access to the cellular network may be provided by a base station 102. It may be common for the base station 102 to operate in conjunction with numerous other base stations (which may provide other cells) and other network hardware and software to provide continuous (or nearly continuous) overlapping wireless service over a wide geographic area. Note that the second UE 106B may be provided with cellular service by the same or a different cellular service provider (which may or may not utilize the same cellular technology) as a cellular service provider of the first UE 106A. Additionally (or as an alternative) it may be possible that one or both of the UEs 106 may obtain voice communication service via another (e.g., non-cellular) technology.

Note that the first voice call may be a circuit-switched call or a packet-switched call (or may have elements of both), e.g., depending on the cellular communication technologies used by the first UE 106A and the second UE 106B. For example, for a UE 106 which communicates according to UMTS, voice communication between the UE 106 and its cellular network might be a circuit-switched service, while for a UE 106 which communicates according to LTE (and supports VoLTE), voice communication between the UE 106 and its cellular network might be a packet-switched service.

In 604, either the first UE 106A or the second UE 106B may transmit a switch caller request. The switch caller request may be transmitted as a result of user input at one or the other of the first UE 106A or the second UE 106B requesting a switch of calling parties for the first voice call. The user input may be received in any of a variety of ways, including via a user interface element in a user interface provided at UE 106A and/or UE 106B via a display, via an audio user interface (e.g., by receiving and interpreting audible instructions by the user), via one or more gestures (potentially including gestures on a touchscreen and/or proximity gestures), and/or in any of various ways. Exemplary user interface options and possibilities are also further described hereinbelow with respect to FIG. 12.

As one possibility, user input requesting the switch of calling parties may be received, and the switch caller request may be transmitted, after the first voice call has been established. In other words, the request to switch callers may be initiated once a user of the second UE 106B has answered the incoming voice call, signaling setup for the first voice call is completed, and first voice call is active such that users of the first UE 106A and the second UE 106B are able to perform voice communication with each other.

However, note that it may also be possible for the switch caller request to be transmitted before the first voice call is established. For example, it may be possible for the switch caller request to be transmitted after the first voice call has been initiated but before the first voice call has been established, e.g., while the first voice call is alerting (e.g., ringing, vibrating, or otherwise notifying a user) the second UE 106B. In this case, a user of the first UE 106A might transmit the switch caller request before a user of the second UE 106B has actually answered the first voice call. As a further possibility, a user of the second UE 106B could transmit the switch caller request while the first voice call is ringing, without needing to answer the first voice call.

Note also that if desired, the switch caller request may be transmitted via a different communication channel than the first voice call. The switch caller request might, for example, be transmitted using a different radio bearer than the first voice call. As one such possibility, a packet-switched radio bearer might be used for the switch caller request, while a circuit-switched radio bearer might be used for a voice call according to UMTS. As another such possibility, a default evolved packet system (EPS) bearer might be used for the switch caller request, while a dedicated EPS bearer might be used for a voice call according to VoLTE. Other options for using different communication channels for the first voice call and the switch caller request are also possible.

In 606, the switch caller request may be accepted. In particular, the switch caller request may be accepted by whichever of the first UE 106A or the second UE 106B received the switch caller request. Acceptance of the switch caller request may be automatic or may be based on user input, depending on the implementation and/or which of the first UE 106A or the second UE 106B initiated the switch caller request. For example, if the switch caller request is transmitted by the called party (e.g., the second UE 106B), the calling party (e.g., the first UE 106A) might be configured to automatically accept the switch caller request. This may be reasonable, for example, if incoming calls are more economically advantageous than outgoing calls according to the service plan of the calling party (as may be common), since in this case switching callers would benefit the calling party. In contrast, if the switch caller request is transmitted by the calling party, it may be preferable to provide the called party with the option of accepting or rejecting the switch caller request, since it may be less likely to be economically advantageous to switch callers according to the service plan of the called party. Note, however, that the above scenarios are exemplary only, and that in general a UE 106 may be configured to respond to switch caller requests automatically or manually as desired, e.g., with or without regard to service plan considerations.

In order to facilitate manual response to a switch caller request (e.g., if a UE 106 is configured for manual response to switch caller requests), a UE 106 may provide one or more user interface elements/options for responding to the switch caller request. For example, user input may be received via a user interface element in a user interface provided at UE 106A and/or UE 106B via a display, via an audio user interface (e.g., by audibly prompting a user for a response and/or receiving and interpreting audible instructions by the user), via one or more gestures (potentially including gestures on a touchscreen and/or proximity gestures), and/or in any of various ways. As noted hereinabove, exemplary user interface options and possibilities are also further described hereinbelow with respect to FIG. 12

Note that it is also possible that the switch caller request may be rejected. An indication that the switch caller request has been rejected may be transmitted to the party which initiated the switch caller request in this case. Alternatively, the switch caller request may be rejected by simply ignoring the switch caller request, in which case the party which initiated the switch caller request may determine that the request has been rejected based on a timeout or in another manner. If the switch caller request is rejected, the first voice call may continue as an active voice call with the first UE 106A as the calling party and the second UE 106B as the called party. Alternatively, if desired, the first voice call may be ended if the switch caller request is rejected.

Accepting the switch caller request may include transmitting an indication that the switch caller request has been accepted. Alternatively (potentially depending on which party requested the switch of calling parties), it may be possible that an explicit indication that the switch caller request has been accepted may not be necessary. For example, if the called party accepts the switch caller request, it may be possible for the called party (e.g., the second UE 106B) to move forward with initiating the process of switching calling parties, which may implicitly indicate to the calling party (e.g., the first UE 106A) that the switch caller request has been accepted.

Once the switch caller request has been accepted, the second UE 106B may initiate the process of switching callers. Note that the actual process of switching callers (e.g., once a switch caller request has been initiated) may be performed automatically (e.g., without further user input from the users of the first UE 106A and the second UE 106B) and in a manner transparent (e.g., substantially unnoticeable) to the users of the first UE 106A and the second UE 106B.

The second UE 106B may initiate a second voice call in 608. The second voice call may be initiated and established in parallel with the first voice call, such that the first voice call and the second voice call may be active simultaneously. For example, the second voice call may be initiated and established using multi-party call features provided according to the cellular communication technology used by the first UE 106A and/or the second UE 106B. The first voice call may thus remain active (or possibly very briefly on hold) while the second call is initiated and established, such that substantially no interruption to the voice call between the first UE 106A and the second UE 106B occurs while the second call is initiated and established.

Once the second voice call has been established (or possibly just before, if a break-before-make switch of calling parties is desired), the first voice call may be disconnected in 610. Since at this point the second voice call may be active, users of the first UE 106A and the second UE 106B may still not notice any interruption to their call. Further, because the second voice call (for which the second UE 106B is the calling party and the first UE 106A is the called party) may have replaced the first voice call at this point, the calling parties may effectively have been switched.

Providing features for automatic and substantially seamless caller switching in a cellular voice call, such as those described hereinabove with respect to FIGS. 5-6, may represent a significant improvement to existing techniques for switching callers. In particular, while previous techniques may require substantial user involvement and interruptions to a call, which may both be a direct annoyance to users and require significant power consumption, an automatic, substantially seamless mechanism such as described herein may require minimal (and highly convenient) user input to initiate a caller switch, after which no further user input may be required, a minimum of signaling may be used to complete the caller switch, and no interruption to the users' ability to communicate may be noticed. Thus, the techniques described herein may both directly improve user experience by minimizing the effort and interruption to accomplish the caller switch, and indirectly improve user experience by using less power to accomplish the caller switch, thereby effectively extending the battery life of the user's device.

As previously noted, various aspects of the features for automatic caller switching in a voice call described herein may be implemented in any of a variety of ways. FIGS. 7-12, and the descriptions thereof provided hereinbelow, provide more detail regarding certain exemplary implementations of some such aspects. It should be recognized that while the details of these exemplary implementations are provided by way of example in order to further illuminate various implementation options, numerous variations on and alternatives to the details provided with reference to FIGS. 7-12 may also be implemented in conjunction with automatic caller switching according to the present disclosure. Accordingly, FIGS. 7-12 and the descriptions thereof provided hereinbelow should not be considered limiting to the disclosure as a whole.

FIGS. 7-10—Exemplary UMTS Implementation

Figure 7:
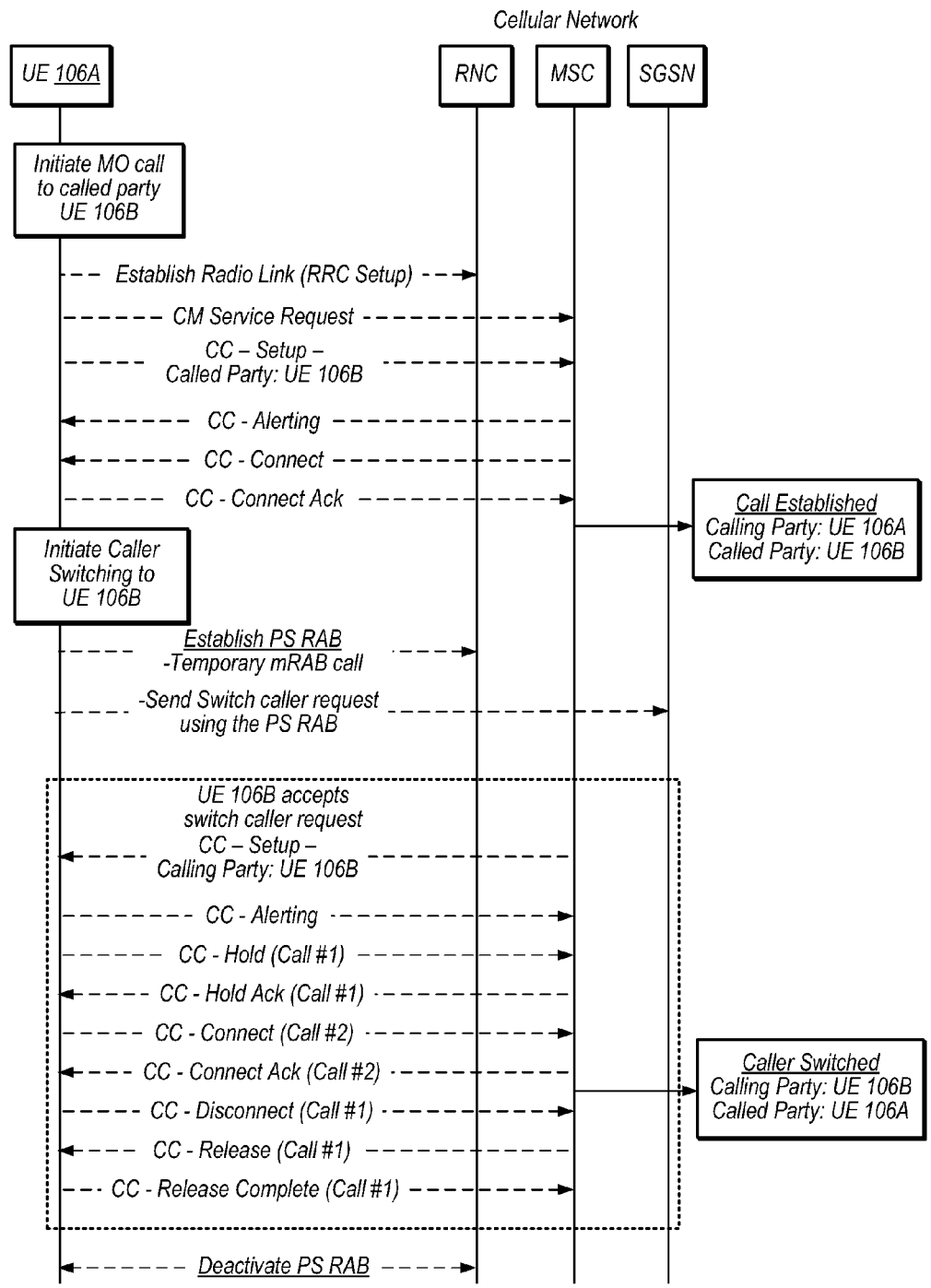
FIGS. 7-8 illustrate an exemplary call signaling flow for switching calling parties in an active voice call according to UMTS.
Figure 8:
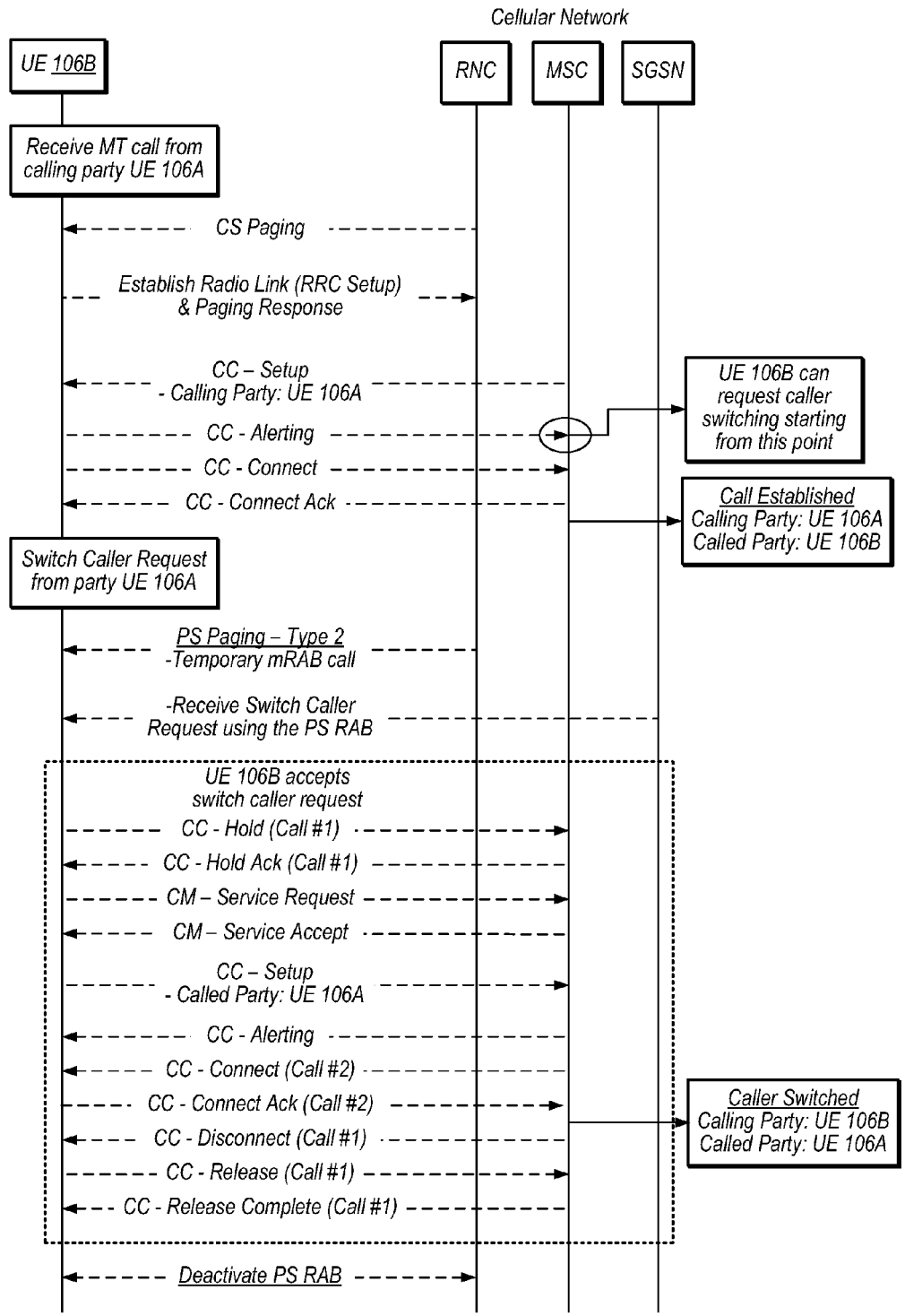
Figure 9:
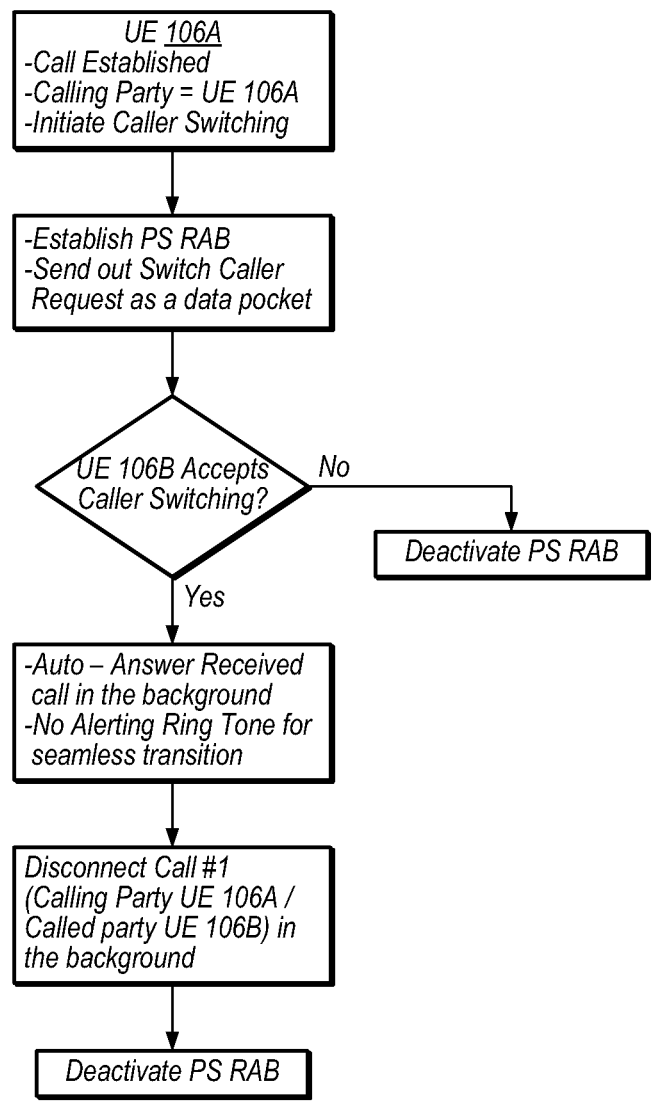
FIGS. 9-10 are flowchart diagrams illustrating exemplary methods for switching calling parties according to UMTS.
Figure 10:
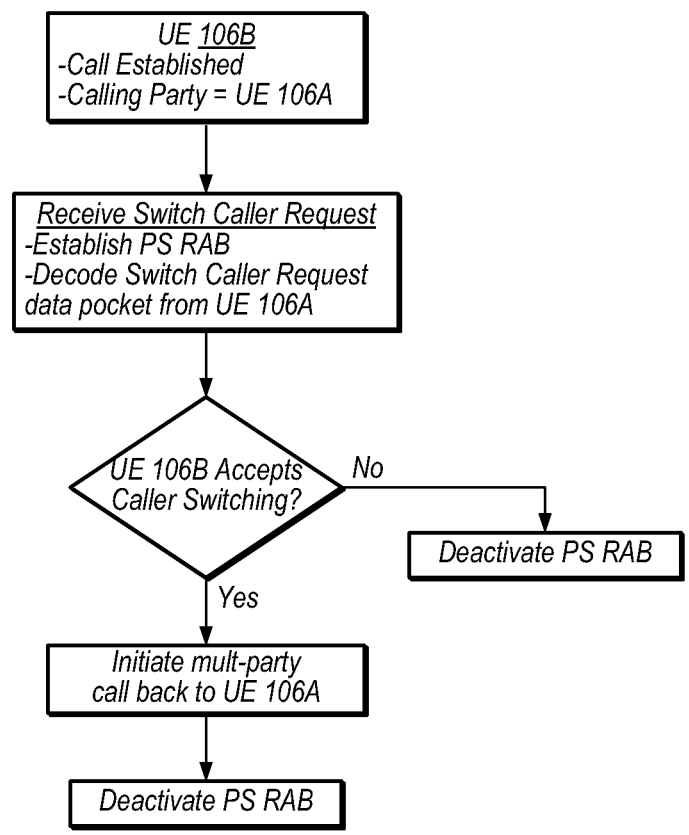

FIGS. 7-10 illustrate aspects of an exemplary implementation of automatic caller switching features in a UMTS cellular network. In particular, FIG. 7 illustrates an exemplary signaling flow between a UMTS cellular network and a first UE 106A which initially calls a second UE 106B, while FIG. 8 illustrates an exemplary signaling flow between the UMTS cellular network and the second UE 106B, over the course of a successful caller switch. FIG. 9 is a flowchart illustrating steps of a method for implementing caller switching which may be performed by the first UE 106A according to the exemplary UMTS implementation, while FIG. 10 is a flowchart illustrating steps of a method for implementing caller switching which may be performed by the second UE 106B according to the exemplary UMTS implementation.

As illustrated, the first UE 106A may initiate a mobile-originated (MO) voice call to the second UE 106B, which may be received by the second UE 106B as a mobile-terminated (MT) voice call with the first UE 106A as the calling party. To do so, the first UE 106A may initially establish a radio link (establish radio resource control (RRC)) with the cellular network, and more particularly with a radio network controller (RNC) entity of the cellular network. Once the radio link is established, the first UE 106A may transmit a connection management (CM) service request, which may be directed to a mobile switching center (MSC) entity of the cellular network. The first UE 106A may then initiate call control (CC) setup with the MSC, with the second UE 106B as the called party. Before the second UE 106B is able to receive a CC setup message (indicating the first UE 106A as the calling party), the second UE 106B may be paged with a CS paging message by the RNC, and in response may establish its own radio link (establish its own RRC) with the RNC. Once the radio link between the second UE 106B and the cellular network is established, the second UE 106B may receive the CC setup message from the MSC. The second UE 106B may return (e.g., via the MSC) a CC alerting message, indicating that the second UE 106B is alerting a user of the second UE 106B of the incoming call (e.g., the second UE 106B may be ringing, vibrating, and/or otherwise providing an indication of the incoming call to a user of the second UE 106B). Once the incoming call is answered, the second UE 106B may return (e.g., via the MSC) a CC connect message to the first UE 106A, indicating that the call has been answered by at the second UE 106B. A CC connect acknowledgement may then be provided by the first UE 106A to the MSC and in turn passed to the second UE 106B, acknowledging that the connection has been established. At this point, the call may be established between the first UE 106A and the second UE 106B, with the first UE 106A as the calling party and the second UE 106B as the called party. Note that the call may be a circuit-switched (CS) call, e.g., such that information (e.g., voice data) may be transmitted between the first UE 106A and the second UE 106B by way of CS radio access bearers (RABs).

Once the call has been established, caller switching may be requested. Alternatively, call switching features may be made available before the call has been established; for example, as one possibility, call switching features may be made available as soon as the second UE 106B is in the alerting stage. As shown in FIGS. 7-8, caller switching may be requested by the calling party (e.g., the first UE 106A). Note, however, that caller switching may also be requested by the called party (e.g., the second UE 106B) in a similar manner.

In order to request caller switching, the first UE 106A may establish a packet-switched (PS) RAB with the RNC entity of the cellular network. Thus, the first UE 106A may (at least temporarily, e.g., in order to facilitate caller switching) establish a multiple RAB (mRAB) call. The first UE 106A may then send a switch caller request (e.g., as a data packet) to the second UE 106B (e.g., via a serving GPRS support node (SGSN) of the cellular network) using the PS RAB. The second UE 106B may be paged by the RNC with a PS paging message (e.g., a type 2 paging message) and may also establish an mRAB call. The second UE 106B may then receive and decode the switch caller request. The second UE 106B may either accept or reject the switch caller request. If the switch caller request is rejected, the PS RAB(s) may be deactivated and the original call may continue.

If the second UE 106B accepts the switch caller request, the second UE 106B may initiate a multi-party call back to the first UE 106A. The first UE 106A may answer the received multi-party call (e.g., "in the background", without any alerting ring tone, vibration, or other typical indication of an incoming call) and disconnect the original call (e.g., also in the background), such that users of the first UE 106A and the second UE 106B may not notice any interruption to their voice call.

More particularly, to establish a return call and disconnect the original call, the first UE 106A and the second UE 106B may then exchange a series of CC messages (via the MSC), which may utilize multi-party call signaling features provided by the MSC, in order to complete the caller switch. In particular, as shown, the second UE 106B may provide a CC hold message for the original call ("call #1") to the MSC, to which the MSC may respond with a CC hold acknowledgement for call #1, which may place call #1 on hold at the second UE 106B. The second UE 106B may then provide a CM service request message to the MSC (e.g., in order to initiate a second call ("call #2"), in response to the switch caller request). The MSC may respond with a CM service accept message. The second UE 106B may then initiate CC setup for call #2 with the second UE 106B as the calling party and the first UE 106A as the called party. The first UE 106A may in turn provide a CC alerting message. The first UE 106A may also provide a CC hold message for call #1 to the MSC, which may be acknowledged by the MSC with a CC hold acknowledgement message for call #1. The first UE 106A may then provide a CC connect message for the call initiated by the second UE 106B in response to the switch caller request ("call #2"), which the second UE 106B may respond to with a CC connect acknowledgment for call #2. At this point the calling parties may have effectively been switched, as call #2, for which the second UE 106B is the calling party and the first UE 106A is the called party, may be established. The first UE 106A may accordingly be able to disconnect the original call, which may be performed by providing a CC disconnect message for call #1 to the second UE 106B, to which the second UE 106B may respond with a CC release message for call #1, which in turn may be responded to by the first UE 106A with a CC release complete message for call #1.

Once call #2 has been established and call #1 has been disconnected, either or both of the first UE 106A and the second UE 106B may deactivate the PS RAB which was established in order to accomplish the switch of calling parties. Alternatively, if desired, either or both of the first UE 106A and the second UE 106B may release the PS RAB as soon as the switch caller request is received, rather than waiting until the caller switch has been successfully completed.

Note that the radio link (RRC) may be contained during the switching process: non-access stratum (NAS) layer signaling (e.g., between the UEs 106 and the MSC) may be used for switching calling parties in the exemplary scenario illustrated in FIGS. 7-8. This may conserve battery by avoiding potentially more power-intensive access stratum (AS) signaling to accomplish the caller switch, as well as potentially provide an improved user experience, as the transition from call #1 to call #2 may be seamless (or very nearly so) and unnoticeable to the user.

Figure 11:
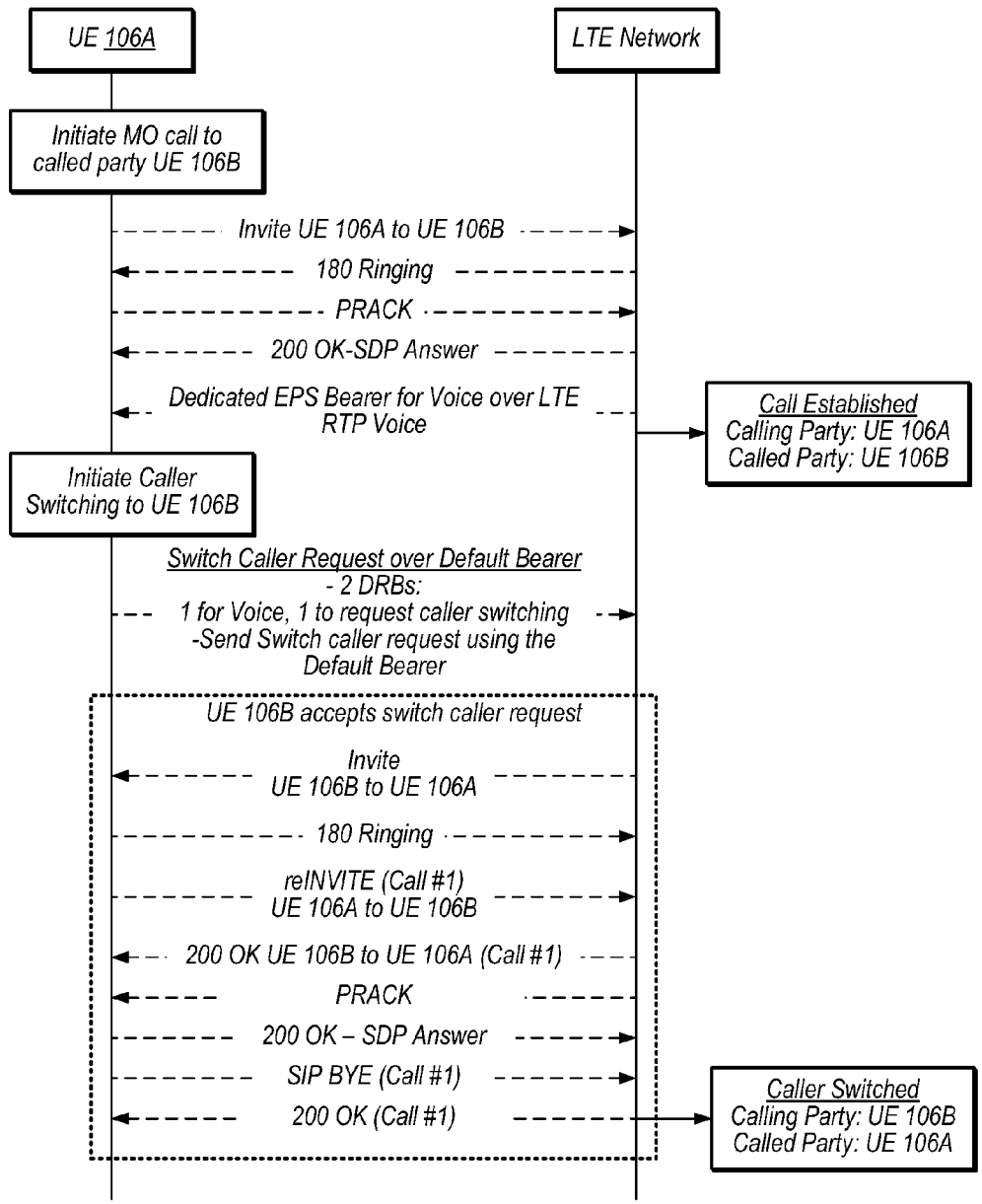
FIG. 11 illustrates an exemplary call signaling flow for switching calling parties in an active voice call according to LTE.

FIG. 11—Exemplary LTE Implementation

FIG. 11 illustrates aspects of an exemplary implementation of automatic caller switching features in an LTE cellular network. In particular, FIG. 11 illustrates an exemplary signaling flow between an LTE cellular network and a first UE 106A which initially calls a second UE 106B, over the course of a successful caller switch. At least the first UE 106A and the LTE network may support Voice over LTE (VoLTE), and thus the initial MO call from the first UE 106A to the second UE 106B, and the caller switching procedure, may utilize session initiation protocol (SIP) for call signaling. Real-time transport protocol (RTP) may be used for the actual voice data transport in the call. The LTE network may include an IP multimedia subsystem (IMS), which may provide a call session control function (CSCF) entity to support VoLTE calls (among other possible functions). The messages shown in FIG. 11 may thus more particularly flow between the first UE 106A and the CSCF entity of the LTE network.

As shown, to initially establish the MO call from the first UE 106A to the second UE 106B, the first UE 106A may provide an invite message to the second UE 106B via a CSCF entity of the LTE network. The second UE 106B may provide a 180 ringing message to the first UE 106A via the CSCF entity. The first UE 106A may provide a provisional acknowledgement (PRACK) message to the second UE 106B via the CSCF entity. The second UE 106B may in turn provide a 200 OK—SDP answer message to the first UE 106A via the CSCF entity. A dedicated evolved packet system (EPS) bearer may then be established and voice data may be exchanged between the first UE 106A and the second UE 106B via RTP (e.g., according to negotiated session parameters). At this point, the call may be established with the first UE 106A as the calling party and the second UE 106B as the called party.

Once the call has been established, caller switching may be requested. Alternatively, as in the exemplary UMTS system described hereinabove with respect to FIGS. 7-10, it may be possible to provide call switching features before the call has been established. As shown in FIG. 11, caller switching may be requested by the calling party (e.g., the first UE 106A). Note, however, that again as in the exemplary UMTS system described hereinabove with respect to FIGS. 7-10, caller switching may also be requested by the called party (e.g., the second UE 106B) in a similar manner.

In order to request caller switching the first UE 106A may provide a switch caller request message via a default EPS bearer. In other words, the first UE 106A may activate a second data radio bearer (DRB) (e.g., the default EPS bearer for the switch caller request in addition to the dedicated EPS bearer for the established voice call) in order to request caller switching. Note also that, as no "switch caller request" may currently be defined and provided for in the SIP protocol, an SIP "switch caller request" packet may need to be defined as an SIP signaling message, and the SIP stacks of the clients (e.g., the first UE 106A and the second UE 106B) and the CSCF entity may need to be modified to recognize such a switch caller request, in order for the caller switching procedure to be functional. Note also that such an SIP/VoLTE approach to performing caller switching during an active voice call may avoid the use of multi-party signaling procedures, such as might be used for a CS/UMTS implementation of caller switching (e.g., as described hereinabove with respect to FIGS. 7-10).

If the second UE 106B accepts the switch caller request, the second UE 106B may provide an invite message to the first UE 106A via the CSCF entity. The first UE 106A may provide a 180 ringing message to the second UE 106B via the CSCF entity. The first UE 106A may also provide a re-invite message for the original call to the second UE 106B via the CSCF entity. In response, the second UE 106B may provide a 200 OK message for the original call to the first UE 106A via the CSCF entity. The second UE 106B may also provide a PRACK message to the first UE 106A via the CSCF entity in response to the 180 ringing message provided by first UE 106A. The first UE 106A may follow up by providing a 200 OK—SDP Answer message to the second UE 106B via the CSCF entity. The first UE 106A may then initiate closing of the original call by providing a SIP BYE message for the original call, to which the second UE 106B may respond by providing a 200 OK message for the original call. At this point, the original call session may be ended, and the replacement call, for which the second UE 106B may be the calling party and the first UE 106A may be the called party, may be active and using the dedicated EPS bearer for RTP voice communications between the first UE 106A and the second UE 106B. In other words, the calling parties may have effectively been switched.

Note that the default EPS bearer may be deactivated after the caller switching if there is no other data application which was previously using the default EPS bearer.

Figure 12:
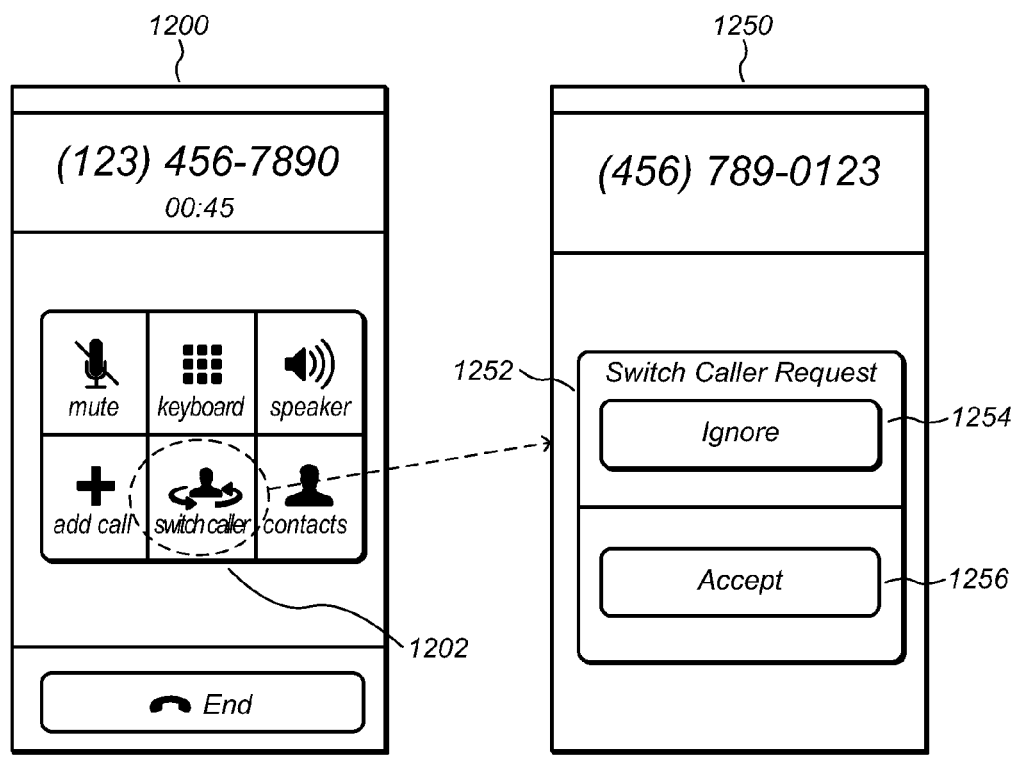
FIG. 12 illustrates exemplary user interface options for providing caller switching features.

FIG. 12—Exemplary User Interface

FIG. 12 illustrates exemplary user interface options for providing caller switching features. During an active voice call, a user interface may be displayed on a display 1200 of a device (e.g., a UE 106), which may be a touch-screen display. Any number of (typically call-related) options may be provided to users of the device during a call, such as muting the device's audio in the call, accessing a touchscreen keyboard during the call, adjusting volume of the call, adding another line to the call, or accessing a list of contacts during the call. Additionally, as shown, a user interface option 1202 (e.g., a button) for switching callers of the call may be displayed, in order to provide a convenient way for users to request caller switching.

If one participant in a voice call requests caller switching, the other participant in the voice call may be prompted to accept or reject (ignore) the caller switch request. As shown, a user interface may be displayed on a display 1250 of the device (e.g., a UE 106) of which caller switching is requested, which may also be a touch-screen display, as one manner of providing such a prompt and receiving user input responding to the prompt. For example, a dialogue box 1252 might be provided, in which user interface options (e.g., buttons) for either ignoring 1254 or accepting 1256 the switch caller request might be displayed.

Note that while the exemplary user interfaces illustrated in FIG. 12 represent possible options for user interface elements by means of which user input indicating a request to switch callers and/or indicating acceptance or rejection of a request to switch callers may be received, any number of other options are also possible. For example, a UE 106 might be configured to utilize any of a variety of user interface elements, individually or in combination, to provide options for prompting and receiving input with respect to caller switching features. For example, any or all of a display, touchscreen, touchpad, mouse, keyboard, camera, microphone, speaker, buttons/dials/sliders/etc., proximity sensing elements, and/or any of various other elements capable of providing information to a user and/or receiving/interpreting user input may be used to provide user interface features in conjunction with the caller switching features described herein according to various embodiments.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for switching calling parties of a voice over LTE (VoLTE) call for a wireless user equipment (UE) device, the method comprising:
   receiving an indication of a mobile-terminated VoLTE call via a LTE cellular network, wherein a second UE is a calling party for the mobile-terminated VoLTE call;
   receiving an indication to switch calling parties for the mobile-terminated VoLTE call;
   arranging to switch calling parties for the mobile-terminated VoLTE call using session initiation protocol (SIP) signaling of a switch caller request based on the indication to switch calling parties for the mobile-terminated VoLTE call, wherein the switch caller request is communicated via a LTE default radio bearer;
   establishing a mobile-originated VoLTE call with the second UE via the LTE cellular network, wherein the UE is a calling party for the mobile-originated VoLTE call, wherein the mobile-originated VoLTE call is established in response to the indication to switch calling parties for the mobile-terminated VoLTE call, wherein the mobile-originated VoLTE call utilizes a LTE dedicated data radio bearer;
   disconnecting the mobile-terminated VoLTE call after the mobile-originated VoLTE call is established.

2. A wireless user equipment (UE) device, comprising:
   a radio, comprising one or more antennas for performing wireless communication;
   a processing element, operably coupled to the radio;
   wherein the radio and the processing element are configured to:
      receive an indication of a mobile-terminated voice over LTE (VoLTE) call via a LTE cellular network, wherein a second UE is a calling party for the mobile-terminated VoLTE call;
      receive an indication to switch calling parties for the mobile-terminated VoLTE call;
      arrange to switch calling parties for the mobile-terminated VoLTE call using session initiation protocol (SIP) signaling of a switch caller request based on the indication to switch calling parties for the mobile-terminated VoLTE call, wherein the switch caller request is communicated via a LTE default data radio bearer;
      establish a mobile-originated VoLTE call with the second UE via the LTE cellular network, wherein the UE is a calling party for the mobile-originated VoLTE call, wherein the mobile-originated VoLTE call is established in response to the indication to switch calling parties for the mobile-terminated VoLTE call, wherein the mobile-originated VoLTE call utilizes a LTE dedicated data radio bearer;
      disconnect the mobile-terminated VoLTE call after the mobile-originated VoLTE call is established.

3. The UE of claim 2,
   wherein the indication to switch calling parties is received while the mobile-terminated VoLTE call is in an alerting stage and has not been fully established.

4. The UE of claim 2, wherein the radio and the processing element are further configured to:
   establish the mobile-terminated VoLTE call,
   wherein the indication to switch calling parties is received after the mobile-terminated VoLTE call has been established,
   wherein in response to the indication to switch calling parties, the mobile-originated VoLTE call is automatically established in parallel to the mobile-terminated VoLTE call,
   wherein after the mobile-originated VoLTE call is established in parallel to the mobile-terminated VoLTE call, the mobile-terminated VoLTE call is automatically disconnected.

5. A wireless user equipment (UE) device, comprising:
   a radio, comprising one or more antennas for performing wireless communication;
   a processing element, operably coupled to the radio;
   wherein the radio and the processing element are configured to:
      initiate a first voice call with a second UE via a cellular network, wherein the UE is a calling party for the first voice call, wherein the first voice call utilizes a radio bearer of a first type;
      receive an indication to switch calling parties for the first voice call;
      arrange to switch calling parties for the first voice call via a radio bearer of a second type based on the indication to switch calling parties for the first voice call;
      establish a second voice call with the second UE via the cellular network, wherein the second UE is a calling party for the second voice call, wherein the second voice call is established in response to arranging to switch calling parties for the first voice call, wherein the second voice call utilizes a radio bearer of a first type; and
      disconnect the first voice call in response to establishing the second voice call,
      wherein the first voice call and the second voice call are Voice over LTE (VoLTE) calls communicated using realtime transport protocol (RTP) transport on dedicated data radio bearers, wherein arranging to switch calling parties for the first voice call via the radio bearer of the second type comprises using session initiation protocol (SIP) signaling of a switch caller request on a default data radio bearer.

6. The UE of claim 5,
wherein the radio and the processing element are configured to arrange to switch calling parties for the first voice call, establish the second voice call, and disconnect the first voice call automatically based on the indication to switch calling parties, wherein automatically establishing the second voice call and disconnecting the first voice call provides a substantially seamless transition between the first voice call and the second voice call.

7. The UE of claim 5,
wherein the second voice call is established in parallel with the first voice call using non-access stratum multi-party call signaling.

8. The UE of claim 5, wherein the radio and the processing element are further configured to:
receive first user input providing the indication to switch calling parties for the first voice call,
wherein arranging to switch calling parties for the first voice call comprises transmitting a request to switch calling parties to the second UE via the radio bearer of the second type based on the indication to switch calling parties for the first voice call, wherein establishing the second voice call is initiated by the second UE in response to the request to switch calling parties.

9. The UE of claim 5, wherein the UE further comprises a display, wherein the UE is configured to:
provide a user interface via the display, wherein the user interface comprises a user interface element for requesting caller switching in a voice call,
wherein the indication to switch calling parties for the first voice call is received as user input via the user interface element for requesting caller switching in a voice call.

10. The UE of claim 5,
wherein the indication to switch calling parties comprises a request to switch calling parties received from the second UE;
wherein the radio and the processing element are configured to establish the second voice call and disconnect the first voice call automatically in response to the request to switch calling parties received from the second UE based on the UE being the calling party for the first voice call.

11. The UE of claim 5,
wherein the indication to switch calling parties comprises a request to switch calling parties received from the second UE;
wherein the radio and the processing element are further configured to:
receive user input accepting the request to switch calling parties received from the second UE;
establish the second voice call and disconnect the first voice call automatically in response to the user input accepting the request to switch calling parties received from the second UE.

* * * * *